United States Patent
Demir et al.

(10) Patent No.: US 12,169,126 B2
(45) Date of Patent: Dec. 17, 2024

(54) CAMERA-BASED LIQUID STAGE MEASUREMENT

(71) Applicant: University of Iowa Research Foundation, Iowa City, IA (US)

(72) Inventors: Ibrahim Demir, Iowa City, IA (US); Muhammed Yusuf Sermet, Iowa City, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 816 days.

(21) Appl. No.: 17/223,270

(22) Filed: Apr. 6, 2021

(65) Prior Publication Data

US 2021/0310807 A1    Oct. 7, 2021

Related U.S. Application Data

(60) Provisional application No. 63/005,754, filed on Apr. 6, 2020.

(51) Int. Cl.
*G01C 13/00* (2006.01)
*G01S 17/88* (2006.01)
(Continued)

(52) U.S. Cl.
CPC ............ *G01C 13/008* (2013.01); *G01S 17/88* (2013.01); *G01S 19/03* (2013.01); *G06T 17/05* (2013.01); *H04M 1/72* (2013.01)

(58) Field of Classification Search
CPC ....... G01C 13/008; G01S 17/88; G01S 19/03; G06T 17/05
See application file for complete search history.

(56) References Cited

U.S. PATENT DOCUMENTS 6,098,029 A * 8/2000 Takagi ................. G01F 23/292
702/55
8,666,431 B2 * 3/2014 Kim ....................... G01N 33/18
455/66.1

(Continued)

FOREIGN PATENT DOCUMENTS

CN       114199343 A  *  3/2022
EP        3018483 A1     5/2016
(Continued)

OTHER PUBLICATIONS

Android Developers, 2018. Location strategies [online]. Available from: http://developer.android.com/guide/topics/location/strategies [Accessed Oct. 17, 2018], 4 pages.
(Continued)

*Primary Examiner* — Natalie Huls
*Assistant Examiner* — Nyla Gavia
(74) *Attorney, Agent, or Firm* — Goodhue, Coleman & Owens, P.C.

(57) ABSTRACT

A method for measuring elevation of an accumulating resource with a visually distinguishable intersecting object includes providing an electronic device comprising a camera and at least one position sensor, performing at least one survey by obtaining sensor readings while the camera is aimed at an intersection, determining an altitude and pitch angle of the camera using the sensor readings; and computing the elevation of the accumulating resource using the geolocation and pitch angle of the camera.

10 Claims, 12 Drawing Sheets

(51) Int. Cl.
G01S 19/03 (2010.01)
G06T 17/05 (2011.01)
H04M 1/72 (2021.01)

(56) References Cited

U.S. PATENT DOCUMENTS

| | | | | |
|---|---|---|---|---|
| 11,107,025 | B2* | 8/2021 | Sun | G06Q 30/0201 |
| 2009/0086014 | A1* | 4/2009 | Lea | G01C 25/00 |
| | | | | 348/E5.062 |
| 2019/0251356 | A1* | 8/2019 | Rivers | G01C 21/203 |

FOREIGN PATENT DOCUMENTS

| | | | | |
|---|---|---|---|---|
| EP | 3018483 | B1 * | 8/2018 | G01C 13/006 |
| WO | 2007032595 | A1 | 3/2007 | |

OTHER PUBLICATIONS

Apple Developer Documentation, 2021. Understanding Reference Frames and Device Attitude [online]. Available from: https://developer.apple.com/documentation/coremotion/getting_processed_device-motion_data/understanding_reference_frames_and_device_attitude [Accessed Mar. 30, 2021], 2 pages.

Bishop, G. and Welch, G., 2001. An introduction to the Kalman filter. Proc of SIGGRAPH, Course, 8 (27599-3175), 59.

Bonney, R., et al., 2009. Citizen science: a developing tool for expanding science knowledge and scientific literacy. BioScience, 59 (11), 977-984. doi:10.1525/bio.2009.59.11.9.

Buchanan, T.J. and Somers, W.P., 1996. Discharge measurements at gaging stations [Online]. Reston, VA: U.S. Geological Survey Techniques of Water-Resources Investigations, ch. A8, 71 pages.

Chandler, J.H., et al., 2008. Measuring a dynamic and flooding river surface by close range digital photogrammetry. Beijing, China: International Society for Photogrammetry and Remote Sensing, 211-216.

Demir, I. and Beck, M.B., 2009. GWIS: A prototype information system for Georgia watersheds. In: Georgia water resources conference: regional water management opportunities. Athens, GA: UGA, 448-453.

Demir, I. and Krajewski, W., 2013. Towards an integrated flood information system: centralized data access, analysis, and visualization. Environmental Modeling and Software, 50, 77-84. doi:10.1016/j.envsoft.2013.08.009.

Demir, I., et al., 2009. Information systems and social legitimacy scientific visualization of water quality. In: Systems, man and cybernetics, 2009. SMC 2009. International conference on IEEE. San Antonio, TX: IEEE, 1093-1098.

Demir, I., et al., 2015. Data-enabled field experiment planning, management, and research using cyberinfrastructure. Journal of Hydrometeorology, 16 (3), 1155-1170.

Demir, I., et al., 2018. Floodss: Iowa flood information system as a generalized flood cyberinfrastructure. International Journal of River Basin Management, 16 (3), 393-400.

Euston, M., et al., 2008. Complementary filter for attitude estimation of a fixed-wing UAV. In: Proceedings of the IEEE/RSJ International Conference on Intelligent Robots and Systems (IROS), 6pages, Sep. 2008 Nice, France.

Gleason, C.J., et al., 2015. Semi-automated effective width extraction from time-lapse RGB imagery of a remote, braided Greenlandic river. Hydrology and Earth System Sciences, 19 (6), 2963-2969.

Horwitz, J., 2018. FCC lets U.S. phones access EU satellites for 3-foot location accuracy. Venture Beat [Online]. Available from: https://venturebeat.com/2018/11/16/fcc-lets-u-s-phones-access-eu-satellites-for-3-foot-location-accuracy/, 5 pages.

Kim, J., Han, Y., and Hahn, H., 2011. Embedded implementation of image-based water-level measurement system. IET Computer Vision, 5 (2), 125-133. doi: 10.1049/iet-cvi.2009.0144.

Krajewski, W.F., et al., 2017. Real-time flood forecasting and information system for the state of Iowa. Bulletin of the American Meteorological Society, 98 (3), 539-554.

Kruger, A., et al., 2016. Bridge-mounted river stage sensors (BMRSS). IEEE Access, 4, 8948-8966.

Leduc, P., Ashmore, P., and Sjogren, D., 2018. Stage and water width measurement of a mountain stream using a simple time-lapse camera. Hydrology and Earth System Sciences, 22 (1), 1-11.

Lin, F., et al., 2013. Applications of image recognition for real-time water level and surface velocity. In: 2013 IEEE international symposium on multimedia (ISM). Anaheim, CA: IEEE, 259-262.

Lowry, C.S. and Fienen, M.N., 2013. CrowdHydrology: crowdsourcing hydrologic data and engaging citizen scientists. GroundWater, 51 (1), 151-156. doi: 10.1111/gwat.2013.51.issue-1.

Madgwick, S., 2010. An efficient orientation filter for inertial and inertial/magnetic sensor arrays. Report X-io and University of Bristol (UK), 25, 1-32.

Mahony, S., Hamel, T., and Pflimlin, J.-M., 2008. Nonlinear complementary filters on the special orthogonal group. IEEE Transactions on Automatic Control, 53, 1203-1217.

Mason, D.C., Bates, P.D., and Dall'Amico, J.T., 2009. Calibration of uncertain flood inundation models using remotely sensed waterlevels. Journal of Hydrology, 368 (1-4), 224-236. doi:10.1016/j.jhydrol.2009.02.034.

Momeni-K, M., et al., 2012. Height estimation from a single camera view. VISAPP, 1, 358-364.

Mordvintsev, A. and Abid, K., 2013. Depth map from stereo images [online]. Available from: https://opencv-python-tutroals.readthedocs.io/en/latest/py_tutorials/py_calib3d/py_depthmap/py_depthmap.html [Accessed Oct. 17, 2018], 3 pages.

Mourcou, Q., et al., 2015. Performance evaluation of smartphone inertial sensors measurement for range of motion. Sensors, 15 (9), 23168-23187. doi:10.3390/s150923168.

Mrovlje, J. and Vrancic, D., 2008. Distance measuring based on stereoscopic pictures. In: 9th international PhD workshop on systems and control: young generation viewpoint. Izola, Slovenia, vol. 6, 6 pages.

National Research Council, 2007. Improving disaster management: the role of IT in mitigation, preparedness, response, and recovery, 193 pages. Washington, DC: The National Academies Press. doi:10.17226/11824.

Sermet, Y. and Demir, I., 2018. An intelligent system on knowledge generation and communication about flooding. Environmental Modelling & Software, 108, 51-60. doi:10.1016/j.envsoft.2018.06.003.

Sit, M.A. and Demir, I., 2019. Decentralized flood forecasting using deep neural networks. Arxiv Preprint, 50, 77-84. doi:10.1016/j.envsoft.2013.08.009.

Tauro, F., et al., 2018. Measurements and observations in the XXI century (MOXXI): innovation and multi-disciplinarity to sense the hydrological cycle. Hydrological Sciences Journal, 63 (2), 169-196. doi: 10.1080/02626667.2017.1420191.

The European Global Navigation Satellite Systems Agency, 2018. FCC approves use of galileo in the U.S. Press Release [Online]. Available from: https://www.gsa.europa.eu/newsroom/news/fcc-approves-use-galileo-US, 5 pages.

van Diggelen, F. and Enge, P., 2015. The World's first GPS MOOC and worldwide laboratory using smartphones. In: Proceedings of the 28th international technical meeting of the satellite division of the institute of navigation (Ion GNSS + 2015). Stanford University, 1-26.

Young, D.S., Hart, J.K., and Martinez, K., 2015. Image analysis techniques to estimate river discharge using time-lapse cameras in remote locations. Computers & Geosciences, 76, 1-10. doi:10.1016/j.cageo.2014.11.008.

Zhao, C., Sun, Q., Zhang, C., Tang, Y. and Qian, F., 2020. Monocular depth estimation based on deep learning: An overview. Science China Technological Sciences, pp. 1-16.

* cited by examiner

```
┌─────────────────────────────────────────────────────────────────┐
│  PROVIDE AN ELECTRONIC DEVICE HAVING A CAMERA AND AT LEAST ONE  │
│                        POSITION SENSOR                          │
│                               16                                │
└─────────────────────────────────────────────────────────────────┘
                                  │
                                  ▼
┌─────────────────────────────────────────────────────────────────┐
│   PERFORM A SURVEY BY OBTAINING SENSOR READINGS FROM THE AT     │
│   LEAST ONE POSITION SENSOR WHILE THE CAMERA IS AIMED AT AN     │
│   INTERSECTION BETWEEN THE ACCUMULATNG RESOURCE AND THE         │
│        VISUALLY DISTINGUISHABLE INTERSECTING OBJECT             │
│                               18                                │
└─────────────────────────────────────────────────────────────────┘
                                  │
                                  ▼
┌─────────────────────────────────────────────────────────────────┐
│   DETERMINE A GEOLOCATION, PITCH ANGLE, AND ROLL OF THE CAMERA  │
│                    USING THE SENSOR READINGS                    │
│                               20                                │
└─────────────────────────────────────────────────────────────────┘
                                  │
                                  ▼
┌─────────────────────────────────────────────────────────────────┐
│ DETERMINE BY A PROCESSOR OF THE ELECTRONIC DEVICE THE ELEVATION │
│   OF THE ACCUMULATING RESOURCE USING THE GEOLOCATION, PITCH     │
│                  ANGLE, AND ROLL OF THE CAMERA                  │
│                               22                                │
└─────────────────────────────────────────────────────────────────┘
```

FIG. 1B

PROVIDE AN ELECTRONIC DEVICE HAVING A CAMERA AND AT LEAST ONE POSITION SENSOR
24

PERFORM A FIRST SURVEY AND A SECOND SURVEY BY OBTAINING SENSOR READINGS FROM THE AT LEAST ONE POSITION SENSOR WHILE THE CAMERA IS AIMED AT AN INTERSECTION BETWEEN THE ACCUMULATING RESOURCE AND THE VISUALLY DISTINGUISHABLE INTERSECTING OBJECT, THE FIRST SURVEY PERFORMED AT A DIFFERENT LOCATION FROM THE SECOND SURVEY
26

DETERMINE A GEOLOCATION, PITCH ANGLE, AND ROLL OF THE CAMERA USING THE SENSOR READINGS FOR EACH OF THE FIRST AND SECOND SURVEYS
28

DETERMINE BY A PROCESSOR OF THE ELECTRONIC DEVICE THE ELEVATION OF THE ACCUMULATING RESOURCE USING THE GEOLOCATION, PITCH ANGLE, AND ROLL OF THE CAMERA
30

FIG. 1C

```
┌─────────────────────────────────────────────────────────┐
│ PROVIDE AN ELECTRONIC DEVICE HAVING A CAMERA AND AT     │
│ LEAST ONE POSITION SENSOR                                │
│                         32                               │
└─────────────────────────────────────────────────────────┘
                            ▼
┌─────────────────────────────────────────────────────────┐
│ PERFORM A SURVEY BY OBTAINING SENSOR READINGS FROM THE AT│
│ LEAST ONE POSITION SENSOR WHILE THE CAMERA IS AIMED AT AN│
│ INTERSECTION BETWEEN THE ACCUMULATING RESOURCE AND THE  │
│ VISUALLY DISTINGUISHABLE INTERSECTING OBJECT             │
│                         34                               │
└─────────────────────────────────────────────────────────┘
                            ▼
┌─────────────────────────────────────────────────────────┐
│ DETERMINE A PITCH ANGLE OF THE CAMERA USING THE SENSOR  │
│ READINGS                                                 │
│                         36                               │
└─────────────────────────────────────────────────────────┘
                            ▼
┌─────────────────────────────────────────────────────────┐
│ DETERMINE A GEOLOCATION FOR THE CAMERA USING THE SENSOR │
│ READINGS                                                 │
│                         38                               │
└─────────────────────────────────────────────────────────┘
                            ▼
┌─────────────────────────────────────────────────────────┐
│ OBTAIN DATA FOR A KNOWN STRUCTURE WITHIN VIEW OF THE CAMERA│
│                         40                               │
└─────────────────────────────────────────────────────────┘
                            ▼
┌─────────────────────────────────────────────────────────┐
│ DETERMINE BY A PROCESSOR OF THE ELECTRONIC DEVICE THE ELEVATION│
│ OF THE ACCUMULATING RESOURCE USING THE GEOLOCATION AND PITCH│
│ ANGLE OF THE CAMERA, AND DATA FOR KNOWN STRUCTURE       │
│                         42                               │
└─────────────────────────────────────────────────────────┘
```

FIG. 1D

PROVIDE AN ELECTRONIC DEVICE HAVING A CAMERA AND AT LEAST ONE POSITION SENSOR
52

PERFORM A FIRST SURVEY AND A SECOND SURVEY BY OBTAINING SENSOR READINGS FROM THE AT LEAST ONE POSITION SENSOR WHILE THE CAMERA IS AIMED AT AN INTERSECTION BETWEEN THE ACCUMULATING RESOURCE AND THE VISUALLY DISTINGUISHABLE INTERSECTING OBJECT, THE FIRST SURVEY PERFORMED AT A DIFFERENT LOCATION FROM THE SECOND SURVEY
54

DETERMINE A GEOLOCATION AND PITCH ANGLE, OF THE CAMERA USING THE SENSOR READINGS FOR EACH OF THE FIRST SURVEY AND THE SECOND SURVEY
56

CONSTRUCT A 2D VECTOR FROM THE LOCATION OF THE CAMERA TO THE INTERSECTION USING THE GEOLOCATION AND PITCH ANGLE OF THE CAMERA FOR EACH OF THE SURVEYS
60

DETERMINE BY A PROCESSOR OF THE ELECTRONIC DEVICE THE ELEVATION OF THE ACCUMULATING RESOURCE USING THE 2D VECTORS
62

FIG. 1E

PROVIDE AN ELECTRONIC DEVICE HAVING A CAMERA AND AT LEAST ONE POSITION SENSOR
70

PERFORM A FIRST SURVEY, A SECOND SURVEY, AND A THIRD SURVEY BY OBTAINING SENSOR READINGS FROM THE AT LEAST ONE POSITION SENSOR WHILE THE CAMERA IS AIMED AT AN INTERSECTION BETWEEN THE ACCUMULATING RESOURCE AND THE VISUALLY DISTINGUISHABLE INTERSECTING OBJECT, EACH OF THE SURVEYS PERFORMED AT A DIFFERENT LOCATION
72

DETERMINE A GEOLOCATION AND PITCH ANGLE OF THE CAMERA USING THE SENSOR READINGS FOR EACH OF THE SURVEYS
74

DETERMINE BY A PROCESSOR OF THE ELECTRONIC DEVICE THE ELEVATION OF THE ACCUMULATING RESOURCE USING THE GEOLOCATION AND PITCH ANGLE OF THE CAMERA AND CONES CONSTRUCTED FOR EACH OF THE SURVEYS
76

FIG. 1F

CAMERA-BASED LIQUID STAGE MEASUREMENT

RELATED APPLICATION

This application claims priority to U.S. Provisional Patent Application No. 63/005,754, filed Apr. 6, 2020, hereby incorporated by reference in its entirety.

FIELD OF THE INVENTION

The present invention relates to monitoring of accumulating resources such as, but not limited to liquids. More particularly, but not exclusively, the present invention relates to monitoring resources such as water.

BACKGROUND

Although the present invention can be applied in a variety of different situations where accumulating liquid or other matter within a container is being measured, for purposes of the background, problems associated with water levels are discussed with particular emphasis on water levels of streams or rivers. However, it should be understood that the present invention need not be limited to such applications.

In the light of recent extreme catastrophic events such, as the flooding induced by hurricanes Harvey and Irma, real-time monitoring and prediction of stream levels are as vital as ever. A common strategy to mitigate the impacts of extreme weather events is to enhance resilience at both the individual and community levels (Sermet et al., 2020). The National Research Council report outlines the importance of the utilization of new technologies to improve monitoring and data acquisition approaches for disaster management and increased resilience (NRC 2007). The report highlights how natural disaster forecasts can be enhanced through large-scale sensor networks and advancements in sensor technology. Rich data collection efforts are actively used in validation studies for remote sensing, environmental modeling and informing public (Demir and Beck 2009, Demir et al. 2009, 2015). Recent developments in remote sensing approaches and in situ monitoring of streams induced further advancements in flood forecasting and inundation modeling (Mason et al. 2009). Accurate measurement of the surface elevation of a water body (e.g. river, lake, reservoir, and sea) is essential for developing flood forecasting models as well as real-time monitoring of flood-prone areas (Krajewski et al., 2017). There are various approaches and implementations to measure stream levels developed by academic, commercial, and government organizations. Common stream measurement approaches include pressure, optic, or acoustic based sensor. Kruger et al. (2016) described stream height sensors that utilize sonar signals to determine the distance between the surface of the stream and the sensor. Data transmission is achieved through a cell modem, and the device is solar-powered while being resistant to extreme weather scenarios. For each deployment site, other parameters (e.g. location, elevation, temperature, voltage) are collected to support flood monitoring and forecast. The US Geological Survey (USGS), a federal agency responsible for stream stage measurements, builds and maintains two types of streamflow gaging stations hosted in a small cabin. One type of the stations is equipped with a tube with an opening to the deeper level of the stream, supplied by a gas cylinder. Gas pressure is measured using a manometer and this measurement indicates a correlation with the water body above the opening. Thus, the water level can be assessed relative to a known measurement. A different type of station uses a stilling well to measure the water depth (Buchanan and Somers 1996). In addition to stream stage, USGS also estimate discharge and develop rating curves at sensor locations.

Current implementations for river stage measurement are costly to design, deploy, and operate, and require exhaustive installation and deployment processes. Trained staff is often needed on site for deployment and routine maintenance. Moreover, deployed sensors that are accessible by the public are prone to the risk of vandalism. Although their functionality proved to be reliable and durable over long periods of time, new approaches should be developed to enable vast and dense coverage for river stage measurements. As the prevalence of smartphones greatly increased over the past decade, various sensors embedded in smartphones can be utilized to support environmental data collection and analysis.

There are several studies using crowdsourcing and smart devices for environmental monitoring (Tauro et al. 2018). Camera-based and photogrammetric solutions for estimating water level, object height, water surface extends, topography, discharge and velocity have been studied extensively in the literature (Chandler et al. 2008, Lowry and Fienen 2013, Young et al. 2015, Gleason et al. 2015). A common approach for water level estimation is to automate the monitoring of a staff gauge installed on a solid structure that intersects the water vertically using camera-equipped embedded systems (Kim et al. 2011, Lin et al. 2013). Image processing techniques are used to determine the intersection of the water body with the staff gauge and recognize the numbers from the image. Kim et al. (2011) over came the challenges introduced by the light reflection by constructing a reflection variation histogram using previous and current images to reveal the boundary between the water surface and the ruler. For conditions at night, images are taken with the help of a flashlight on the camera. Lin et al. (2013) benefited from infrared spotlights and wipers to avoid complications caused is by dark or rainy weather conditions. Leduc et al. (2018) utilized a time-lapse camera installed on the ground to monitor a stream and automatically process the video feed to extract the stage and water surface extend. Water level gauging is done by using a staff gauge that is installed on site in addition to the cameras. The proposed method requires a recognizable structure that exists on the stream such as a boulder.

Stereo imaging can be used to generate depth maps by utilizing two cameras looking at the same scene from two different angles. Given that the distance between cameras and their focal lengths are known, epipolar geometry is used to find the corresponding points in two images followed by the calculation of disparity (Mordvintsev and Abid 2013). Mrovlje and Vrancic (2008) present a method to use stereoscopic images to understand the distance of a selected object to the camera by benefiting from the technical information such as the displacement of the object between pictures, focal length, and the distance between the cameras. Both stereo imaging approaches only show that objects are at different depths and does not provide quantitative analysis of the actual height of the target.

Momeni-K et al. (2012) outline a method to estimate the height of an object in a picture knowing only the height and pitch angle (with respect to the ground) of a single camera and a vanishing point. The vanishing point does not need to be in the picture taken. It is only required that a vanishing point can be determined. The results of the experiment were accurate at low pitch angles, though higher percentage errors corresponded to higher pitch angles.

The summarized approaches introduce several challenges and limitations as the coverage density and the size of the deployment area increases. Installing devices and/or metrics requires obtaining permission from authorized parties. Some of these approaches require recognizable markers and staff gauges around the monitoring area. As one of the end goals of these applications is the public use, relying merely on image processing may become computationally costly considering a large-scale implementation. Server-based approaches suffer from this computational need economically while client-based approaches may jeopardize the user experience which is may result in poor user engagement and retention. Furthermore, solutions that are primarily based on image recognition for water level assessment introduces an error margin as the scene conditions (i.e. lighting, weather, background, unforeseen events) vary. Finally, depth recovery approaches that primarily rely on stereo imaging or affordable LIDAR sensors suffer from low measurement range (Zhao et al., 2020).

Thus, what is needed are new and improved systems and methods which allow for measurement of accumulating liquid within a container including measurement of water levels.

SUMMARY

Therefore, it is a primary object, feature, or advantage of the present invention to improve over the state of the art.

It is a further object, feature, or advantage of the present invention to provide for liquid stage measurements or measurement of other accumulating resources.

It is a still further object, feature, or advantage of the present invention to provide for methods and apparatus for liquid stage measurements (or other accumulating resources) which are reliable and low cost.

It is another object, feature, or advantage of the present invention to provide a water level measurement sensor available that does not require an on-site gauge installation.

It still another object, feature, or advantage of the present invention to provide a system for determining level of an accumulating resource which may be implemented using a mobile phone.

A further object, feature, or advantage of the present invention is to combine inertial measurements with images from a camera and use methods based on geometry to determine level of an accumulating resource.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a method for measuring elevation of an accumulating resource with a visually distinguishable intersecting object includes providing an electronic device comprising a camera and at least one position sensor, performing at least one survey by obtaining sensor readings while the camera is aimed at an intersection, determining a geolocation (which may include a latitude, longitude, and an altitude) and pitch angle of the camera using the sensor readings; and computing the elevation of the accumulating resource using the geolocation and pitch angle of the camera. The accumulating resource may be water within a river or stream. The electronic device may be a mobile device such as a mobile phone or an application specific device. The at least one position sensor may include geolocation receiver and an inertial measurement unit or inertial sensor. The computing the elevation may further use a digital elevation model or terrain information. The computing the elevation may further include constructing at least one three-dimensional vector. The electronic device may further include a LIDAR sensor. The method may further include determining a roll angle of the camera using the sensor readings and wherein the computing by the processor of the electronic device the elevation of the accumulating resource is further performed using the roll angle of the camera. The computing by the processor of the electronic device of the elevation of the accumulating resource using the geolocation and pitch angle of the camera may be performed by applying a three-cone intersection method. The computing by the processor of the electronic device of the elevation of the accumulating resource using the geolocation and pitch angle of the camera may be performed by computing an intersection of 2D vectors. The computing by the processor of the electronic device of the elevation of the accumulating resource using the geolocation and pitch angle of the camera may be performed by computing an intersection of a 2D vector with a known structure. The computing by the processor of the electronic device of the elevation of the accumulating resource using the geolocation and pitch angle of the camera may be performed by computing a minimal distance between 3D vectors. The computing by the processor of the electronic device of the elevation of the accumulating resource using the geolocation and pitch angle of the angle may be performed by computing an intersection of a 3D vector and a digital elevation model.

According to another aspect, a method for measuring elevation of an accumulating resource with a visually distinguishable intersecting object is provided. The method may include providing an electronic device comprising a camera and at least one position sensor. The method may further include performing a survey by obtaining sensor readings from the at least one position sensor while the camera is aimed at an intersection between the accumulating resource and the visually distinguishable intersecting object. The method may further include determining a geolocation, pitch angle, and roll of the camera using the sensor readings. The method may further include determining by a processor of the electronic device the elevation of the accumulating resource using the geolocation, pitch angle, and roll of the camera by: obtaining a location of the camera using a geolocation device of the electronic device, obtaining a 3D earth surface model for an area including the intersection, constructing a directional vector from the location of the camera to the intersection using the geolocation, pitch angle, and roll of the camera, and determining the elevation of the accumulating resource at the intersection using the directional vector and the 3D earth surface model.

According to another aspect, a method for measuring elevation of an accumulating resource with a visually distinguishable intersecting object is provided. The method may include providing an electronic device comprising a camera and at least one position sensor. The method may further include performing a first survey and a second survey by obtaining sensor readings from the at least one position sensor while the camera is aimed at an intersection between the accumulating resource and the visually distinguishable intersecting object, the first survey performed at a different location from the second survey. The method may further include determining a geolocation, pitch angle, and roll of the camera using the sensor readings for each of the first and second surveys. The method may further include determining by a processor of the electronic device the elevation of the accumulating resource using the geolocation, pitch angle, and roll of the camera by: constructing a directional vector from the location of the camera to the intersection using the geolocation, pitch angle, and roll of the camera for each of the first and second surveys, and determining the elevation of the accumulating resource at the intersection using the directional vector for each of the first and second surveys.

According to another aspect, a method for measuring elevation of an accumulating resource with a visually distinguishable intersecting object is provided. The method includes providing an electronic device comprising a camera and at least one position sensor. The method may further include performing a survey by obtaining sensor readings from the at least one position sensor while the camera is aimed at an intersection between the accumulating resource and the visually distinguishable intersecting object. The method may further include determining a geolocation and pitch angle of the camera using the sensor readings for the survey. The method may further include determining a location for the camera using the sensor readings. The method may further include obtaining data for a known structure within view of the camera. The method may further include determining by a processor of the electronic device the elevation of the accumulating resource using the geolocation and pitch angle of the camera, the location for the camera and the data for the known structure within the view of the camera by: constructing a two dimensional vector from the location of the camera to the intersection using the geolocation and pitch angle of the camera for the survey, and determining the elevation of the accumulating resource at the intersection using the two dimensional vector and the data for the known structure.

According to another aspect, a method for measuring elevation of an accumulating resource with a visually distinguishable intersecting object is provided. The method may include providing an electronic device comprising a camera and at least one position sensor and performing a first survey and a second survey by obtaining sensor readings from the at least one position sensor while the camera is aimed at an intersection between the accumulating resource and the visually distinguishable intersecting object, the first survey performed at a different location from the second survey. The method may further include determining a geolocation and pitch angle of the camera using the sensor readings for each of the first and second surveys. The method may further include determining by a processor of the electronic device the elevation of the accumulating resource using the geolocation and pitch angle of the camera by: for each of the first and second surveys constructing a directional vector from the location of the camera to the intersection using the geolocation and pitch angle of the camera, and determining the elevation of the accumulating resource at the intersection using the directional vector for each of the first and second surveys.

According to another aspect, a method for measuring elevation of an accumulating resource with a visually distinguishable intersecting object is provided. The method may further include providing an electronic device comprising a camera and at least one position sensor and performing a first survey, a second survey, and third survey by obtaining sensor readings from the at least one position sensor while the camera is aimed at an intersection between the accumulating resource and the visually distinguishable intersecting object, each of the surveys performed at a different location. The method may further include determining a geolocation and pitch angle of the camera using the sensor readings for each of the surveys and determining by a processor of the electronic device the elevation of the accumulating resource using the geolocation and pitch angle of the camera by: for each of the surveys constructing a cone from the geolocation of the camera to the intersection using the pitch angle of the camera, and determining the elevation of the accumulating resource at the intersection using the cone for each of the first, second, and third surveys.

According to another aspect, a system is provided. The system is configured for measuring elevation of an accumulating resource with a visually distinguishable intersecting object. The system may include an electronic device having a camera and at least one position sensor. The system may be configured to perform at least one survey by obtaining sensor readings while the camera is aimed at an intersection, determine a geolocation and pitch angle of the camera using the sensor readings; and compute the elevation of the accumulating resource using the geolocation and pitch angle of the camera. The at least one position sensor may include a GPS receiver and an inertial measurement unit. The system may further include one or more servos attached to the camera for adjusting position of the camera. The system may further include one or more transceivers operatively connected to the intelligent control. The system may further include determining a roll angle of the camera using the sensor readings and wherein the computing by the processor of the electronic device the elevation of the accumulating resource is further performed using the roll angle of the camera.

According to another aspect, a system includes a computing device. The computing device includes an intelligent control in the form of a processor and a memory operatively connected to the processor. The memory includes a plurality of instructions which may be executed on the processor to measure elevation of an accumulating resource with a visually distinguishable intersecting object.

BRIEF DESCRIPTION OF THE FIGURES

FIG. 1B is an additional flow chart of the method.
FIG. 1C is an additional flow chart of the method.
FIG. 1D is an additional flow chart of the method.
FIG. 1E is an additional flow chart of the method.
FIG. 1F is an additional flow chart of the method.

DETAILED DESCRIPTION

Figure 1A:
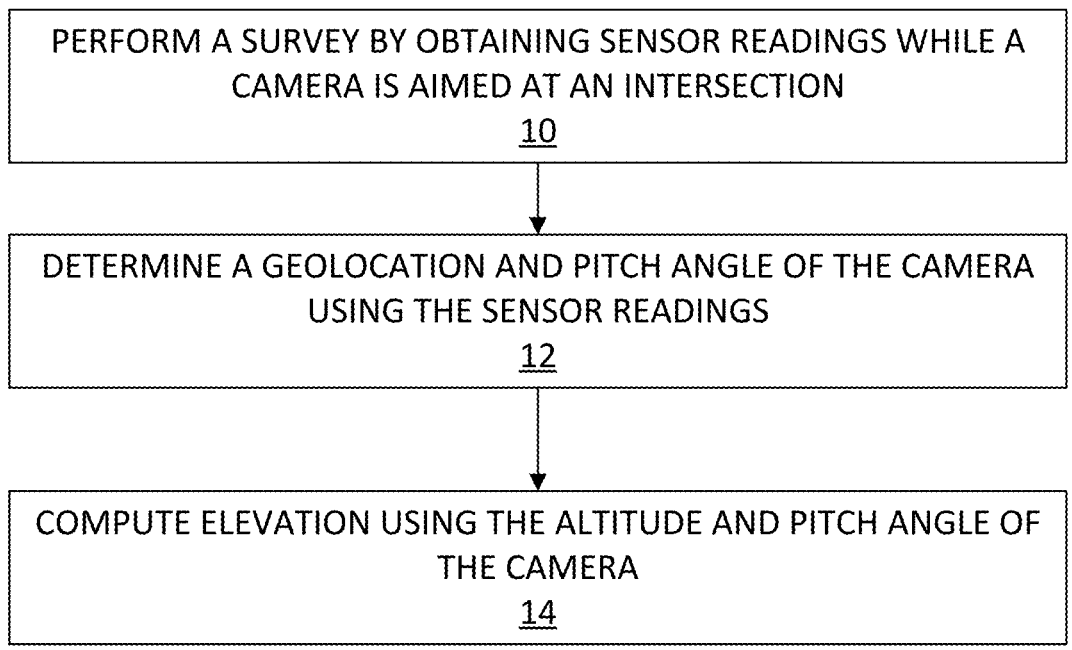
FIG. 1A is a flowchart illustrating a method for determining the elevation of an accumulating resource with a visually distinguishable intersecting object.

The present invention provides for novel approaches to measure water levels (e.g. river, lake) using artificial intelligence and modern sensor technologies. The proposed approaches can be implemented and utilized through any computational device (e.g. smartphone, single-board computer) equipped with an Inertial Measurement Unit (IMU) or other inertial sensor, GPS sensor (or other geolocation sensor), and a camera. These methods can be used to build a stand-alone stage sensor that may be deployed on site near the water source to be monitored. These approaches allow a low-cost solution that will measure water levels to power environmental monitoring, research and decision making.

The disclosed invention can be summarized as a novel methodology to measure the elevation of water bodies (e.g. river, lake, sea, ocean) using artificial intelligence and modern sensor technologies. We define the methodology as an algorithmic process which depends on the specific hardware setup and mathematical calculations. The required hardware setup can be summarized as a computing device that is equipped with camera, GPS sensor (or other geolocation sensor), and an Inertial Measurement Unit (IMU) or other inertial sensor. Examples to such hardware include single-board computers (e.g. Arduino, Raspberry Pi) and smartphones. Measurement of water body elevation is defined as the estimation of water surface elevation relative to the position of the measurement unit. As the unit's geolocation is known, water surface elevation may be calculated in relation to sea level, resulting in the true elevation of the water body at the point that the body is surveyed.

FIG. 1A-1F illustrates examples of the method. FIG. 1 illustrates the general method. In step 10, a survey is performed by obtaining sensor readings while a camera is aimed at an intersection between the surface of an accumulating resource and an object. In step 12, a geolocation (which includes an altitude) and pitch angle of the camera is determined using the sensor readings. Then in step 14 elevation is computed using the geolocation and pitch angle of the camera. As used here, the pitch angle represents the camera's movement up and down when pointed towards the intersection. As used here, generally, roll angle is for the left-right movement. For demonstration, in the case of a smartphone, pitch angle is the rotation about an axis running from the device's left side to right side, whereas the roll angle is the rotation about an axis running from the device's upper side to its lower side (Apple Developer Documentation, 2021). It is to be understood that sometimes yaw and roll angles are used in their opposite sense for smartphones and stand-alone cameras in the literature. However, one skilled in the art would understand that orientation is defined as three angles (pitch, roll, and yaw) based on a chosen reference point and thus can discern the appropriate angle from context. In some implementations of this method more than one survey is performed. In some implementations of this method, roll for the camera is also determined from sensor readings.

In some implementations of this method additional data is used such as information regarding particular objects or digital elevation model (DEM) information or terrain information.

It is to also be understood, that in some applications, such as when the method is performed using a mobile application executing on a mobile device equipped with a geolocation sensor, the geolocation, including the latitude, longitude, and altitude, may be continuously measured as is the pitch angle. In other application, such as in some embodiments of stand-alone devices, the latitude, longitude, and altitude of the device (including camera) need only be measured once during installation. It is also to be understood that in various computations, it is the altitude component of the geolocation which is used. Thus, where geolocation is used in a calculate, it is to be understood that, depending on context, only the altitude portion of the geolocation is used.

As shown in FIG. 1B, in step 16, an electronic device having a camera and at least one position sensor is provided. The at least one position sensor may include an inertial measurement unit (IMU). In step 18, a survey is performed by obtaining sensor readings from the at least one position sensor while the camera is aimed at an intersection between the accumulating resource and the visually distinguishable intersecting object. In step 20, the geolocation (including altitude), pitch angle, and roll of the camera is determined using the sensor readings. In step 22, a processor or other intelligent control of the electronic device determines the elevation of the accumulating resource using the geolocation, pitch angle, and roll of the camera. One way in which this determination may be performed is by obtaining a location of the camera using a geolocation device of the electronic device. The geolocation device may be a global navigation satellite system (GNSS) receiver such as a Global Positioning System (GPS) receiver. A 3D earth surface model may also be obtained. The 3D earth surface model includes an area which includes the intersection and the camera. The 3D earth surface model may be based on terrain information or may be a Digital Elevation Model (DEM) such as is available from the U.S. Geological Survey (USGS). The 3D earth surface model may be obtained such as by electronically accessing the 3D earth surface model over a communications network or my accessing a memory upon which the 3D earth surface model is stored. A directional vector may then be constructed from the location of the camera to the intersection using the altitude, pitch angle, and roll of the camera. Then, the elevation of the accumulating resource at the intersection may be determined geometrically by using the directional vector and the 3D earth surface model.

Thus, in this approach, the construction of a 3D vector between the camera and the water intersection with the land may be used to estimate the water level. It employs the 3D model of the Earth's surface using a 3D earth surface model such as Light Detection and Ranging (LIDAR) data and Digital Elevation Model (DEM) resources while utilizing pitch and roll angles of the camera to create a directional vector that starts from the user's location. The point of intersection (POI) can be discovered at the is intersection of the user aimed vector and the land surface performing only one survey.

As shown in FIG. 1C, in step 24 an electronic device having a camera and at least one position sensor is provided. Next in step 26, first survey and a second are performed. Each survey is performed by obtaining sensor readings from the at least one position sensor while the camera is aimed at an intersection between the accumulating resource and the visually distinguishable intersecting object. The first survey is performed at a different location from the second survey. In step 28, a geolocation (including an altitude), pitch angle, and roll of the camera is determined using the sensor readings for each of the first and second surveys. In step 30 a determination is made by a processor of the electronic device of the elevation of the accumulating resource using the geolocation, pitch angle, and roll of the camera. This determination may be made by constructing a directional vector from the location of the camera to the intersection using the geolocation, pitch angle, and roll of the camera for each of the first and second survey. Then the elevation of the accumulating resource at the intersection may be determined geometrically using the directional vector for each of the first and second surveys.

Thus, in this second approach two surveys of the same POI are used to construct 3D vectors using the roll and pitch angles of the camera. The point where two vectors intersect or have the minimum distance from each other represents the POI, thus providing the water level relative to the user's original location.

As shown in FIG. 1D, in step 32, an electronic device having a camera and at least one position sensor is provided. In step 34, survey is performed by obtaining sensor readings from the at least one position sensor while the camera is aimed at an intersection between the accumulating resource and the visually distinguishable intersecting object. Next in step 36, a pitch angle of the camera is determined for the survey. Then in step 38 a geolocation for the camera (including altitude) is determined using the sensor readings. In step 40 data for a known structure within view of the camera is obtained. In step 42, the processor of the electronic device determines the elevation of the accumulating resource using the geolocation and pitch angle of the camera and data for the known structure.

Thus, this third approach aims to find the water level by virtually constructing a 2D vector between the camera and the water intersection with a structure. It requires a clearly visible structure (i.e. bridge column, building, etc.) with an even surface and known geolocation that intersects with the water. The geolocation of the structure is retrieved from a database of known locations filtered by a predetermined radius from the user's location. Once it is available, a 3D vertical vector with infinite height (i.e. the size of points on the y-axis) is constructed using only the latitude and longitude. A 2D plane is distinguished between the vertical infinite vectors of the structure and the user, thus eliminating the need for roll angle. A 2D vector is then generated using the user's geolocation as the starting point in the direction of the pitch angle of the camera. The intersection of these 2 vectors results in the desired altitude which, along with the latitude and longitude of the structure, constitutes the 3D point of interest. Thus, one survey is sufficient to estimate the water level. Normally, this approach does not require the roll angle if the structure that intersects with water has a flat surface. However, if the structure (e.g. a bridge leg) has a non-flat complex shape, then the roll angle is needed for the computation. Thus, for this approach, roll angle is an optional requirement based on the type of structure.

Real-world 3D structures can be defined in various ways. For example, points may be extracted from Google Earth or other geographical information systems. Alternatively, 3D structures can be defined through manual measurements such as may be performed with laser sensors. Alternatively, high-resolution DEM data may be used in defining structures. Yet another alternative is to retrieve structure plans from local agencies or other organizations. Of course, 3D structures may be defined in other ways as well as may be appropriate in a particular application and/or environment. As shown in FIG. 1E, in step 52, an electronic device having a camera and at least one position sensor is provided. In step 54, a first survey and a second survey are performed. The first survey and the second survey are performed at different locations. In step 56, a geolocation and pitch angle of the camera are determined using the sensor readings for each of the first survey and the second survey. In step 60, 2D vectors are constructed from the location of the camera at each of the surveys to the intersection using the geolocation (altitude) and pitch angles of the camera for each of the surveys. In step 62, a processor of the electronic device may determine the elevation of the accumulating resource using the 2D vectors.

Thus, this fourth approach introduces an addition to the second approach to eliminate the need for roll angle. For both surveys, it is assumed that the user's geolocation will not differ in terms of the x-axis, i.e. will be fixed on x=a point. Furthermore, the POI has to be on the same x=a plane as well. This enables the opportunity to construct a 2D plane in which only the pitch angle will take a role to identify the altitude of the POI relative to the user's original location. A practical use case of this approach is to perform surveys in the same location (e.g. window) in a building on different floors.

As shown in FIG. 1F, in step 70, an electronic device having a camera and at least one position sensor is provided. In step 72, a plurality of surveys are performed including a first survey, a second survey, and a third survey at different locations. In each survey, sensor readings are obtained from at least one position sensor while the camera is aimed at an intersection between the accumulating resource and the visually distinguishable intersecting object. In step 74, a geolocation (including altitude) and pitch angle of the camera is determined from the sensor readings of each of the surveys. Then in step 76, a processor determines the elevation of the accumulating resource using the geolocation and pitch angle of the camera and cones constructed for each of the surveys.

In this fifth approach, the construction of three cones as a result of the three surveys of the same POI from different locations independent of the axis of difference. The pitch angle of the camera is used as the slope of each unique cone. The intersection of the first two cones yields a circle which then intersects with the third cone to discover the POI's location relative to the user's original location.

In the spherical coordinate system, a point is defined by radius, azimuth, and inclination (r, θ, and ϕ, respectively). Similar to polar coordinates, the radius is the Euclidean distance of the point from the origin, whereas the azimuth is the angle from the x-axis in the x-y plane. Inclination (i.e. polar angle) represents the angle from the positive z-axis to the line segment from origin to point. If the radius is removed from the function, the azimuth and inclination define a vector of infinite length. Additionally, removal of the azimuth allows the polar angle to define an infinite cone. In Cartesian coordinates, the equation of a cone is defined as:

$$z = c\sqrt{(x-a)^2 + (y-b)^2} \qquad (1)$$

where a and b are the x- and y-translation of the vertex (i.e. the point of the cone, apex) and c is the slope of the cone surface. The x- and y-translations are the displacements in the x and y directions of the vertex of the cone. The slope of the cone, c, can be calculated using the pitch angle. It is assumed that the line segment, s, represents the surface of the cone, whereas ϕ represents the pitch angle. Since c is the slope of s, it can be deduced that $$c = \frac{\Delta x}{\Delta y} = \tan(\phi).$$

Thus, an infinite cone is uniquely determined by its vertex and its slope. It is known that the target point of interest (POI) lies somewhere on the surface of this cone.

An additional survey is needed on the same point of interest to construct the second cone. Once constructed, the intersection of these two cones, when projected into $\Re^2$, can be formulated as:

$$I_{1,2} = \frac{c_1^2 c_2^2}{c_2^2 - c_1^2}\left[(a_1 - a_2)^2 + (b_1 - b_2)^2\right] = \left(x - \left(\frac{a_1 c_1^2 - a_2 c_2^2}{c_2^2 - c_1^2}\right)\right)^2 + \left(y - \left(\frac{b_1 c_1^2 - b_2 c_2^2}{c_2^2 - c_1^2}\right)\right)^2 \quad (2)$$

where $a_i$, $b_i$, and $c_i$ are the x-translation, y-translation, and slope of the cone i, respectively. The point of interest now lies in the set $I_{1,2}$, which defines all the points in $\Re^2$ where the two cones have the same z-coordinate.

Finally, the third cone is constructed upon a survey of the same POI, and its intersection with the first cone (i.e. $I_{1,3}$) is calculated as explained above. This intersection yields the set of all the points where cones 1 and 3 have the same z-value. Then, the intersection of intersected cone pairs (i.e. $I_{1,2} \cap I_{1,3}$) is found (FIG. 1). There are three cases depending on how many points are in the set $I_{1,2} \cap I_{1,3}$: (a) $|I_{1,2} \cap I_{1,3}|=0$, meaning that no intersections were found; (b) $|I_{1,2} \cap I_{1,3}|=1$, meaning that one potential POI is discovered; and (c) $|I_{1,2} \cap I_{1,3}|=2$, meaning that two potential POIs are discovered, in which case the point that is in front of the surveyor is selected as the POI. Once the POI is determined, the height can be found by entering the x and y values of the POI into any of the original cone equations.

Figure 2:
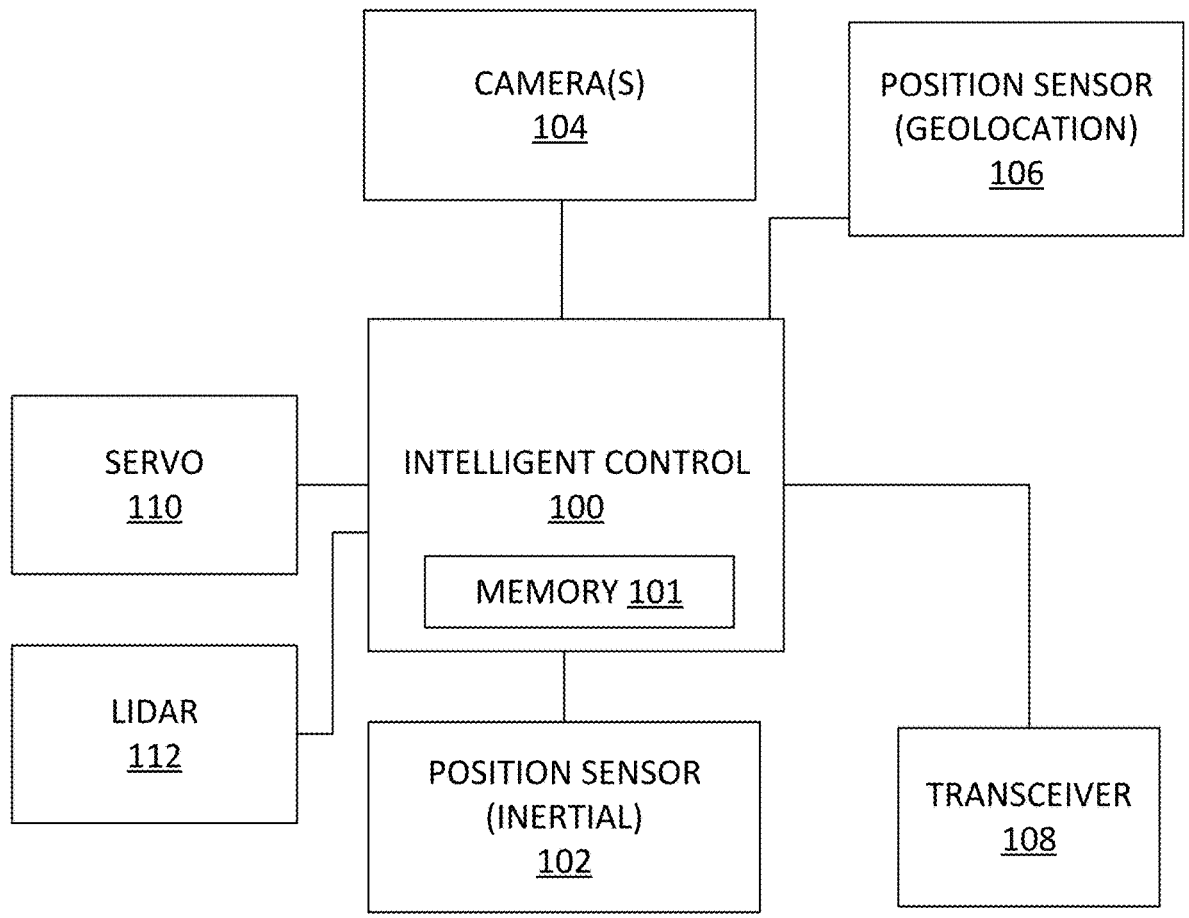
FIG. 2 illustrates one example of an electronic device which may be used.

Thus, the present invention provides for various geometry-based solutions for determining a level of an accumulating resource such as a water level measurement that uses the hardware setup described above and shown in FIG. 2. FIG. 2 illustrates one example of an electronic device. The device may have an intelligent control 100 such as a processor, micro-controller, application-specific-integrated circuit, or other type of intelligent control. The intelligent control 100 may be operatively connected to a position sensor 102 such as an inertial sensor such as inertial measurement unit (IMU) configured to measure parameters such as altitude, pitch, roll and/or yaw. Where used, the inertial measurement unit (IMU) may include gyroscopes and accelerometers and is configured for measuring linear and angular motion.

The intelligent control 100 may also be operatively connected to a position sensor 106 such as a geolocation sensor such as a Global Navigation Satellite Systems (GNSS) receiver such as a Global Positioning System (GPS) receiver, a transceiver 108 (such as a cellular modem), a servo 110, and one or more cameras 104. The servo 110, where used may be used to aim or re-position the one or more cameras 104. Any number of power sources may be used depending upon the application or implementation. For example, where self-contained low-cost units are being used, a solar cell may be included to allow for solar power. Alternatively, batteries may be used, or other types of available power sources may be used. In some embodiments, sensors such as LIDAR sensors 112 or other types of measurement devices may be included as well.

The intelligent control 100 which may be a processor may also be operatively connected to a memory 101. The memory 101 may include instructions for performing the various methods shown and described herein including the methods shown in FIGS. 1A-1F and their variations and alternatives. The memory 101 may be a non-transitory machine readable memory. The instructions stored on the memory 101 may be executed on the processor.

The various approaches described herein may be performed with a camera-equipped device (e.g. a smartphone, Raspberry Pi) that has required sensors (e.g. GPS, IMU). Approaches presented in this disclosure are listed with their sensor and survey requirements in Table 1. A survey is performed by taking a snapshot of the sensor readings while aiming the camera at the desired location of measurement (e.g. an intersection of water surface with another feature in the scene). All presented approaches use altitude (which may be a part of geolocation) and pitch angle of the camera from the survey as a common requirement.

TABLE 1

Requirements for geometry-based approaches

| Approach | Position | Altitude | Pitch | Roll | Surveys | Misc. |
| --- | --- | --- | --- | --- | --- | --- |
| 1. 3D Vector + DEM | Survey lat/long | Yes | Yes | Yes | 1 | DEM or terrain info |
| 2. Minimal Distance between 3D Vectors | Survey lat/long | Yes | Yes | Yes | 2 | — |
| 3. 2D Vector with Known Structure | Survey lat/long | Yes | Yes | — | 1 | Bridge, building |
| 4. Intersection of 2D Vectors | Survey lat/long | Yes | Yes | — | 2 | All fixed-on x = a plane |
| 5. 3-Cone Intersection | Survey lat/long | Yes | Yes | — | 3 | — |

Various approaches may be implemented, deployed, and benchmarked. It is to be understood that in particular situations, one approach may be more advantageous than other approaches. For example, the first approach is suitable for use in places where DEM data is stable and less affected by natural incidents such as erosion, mudslide, and plant growth. The third approach is suitable for places that features a distinct structure that has a water-crossing (e.g. bridge, building). Both approach 1 and 3's dependence on the absolute position of the surveyor and requiring only one survey makes it plausible for implementation as a stand-alone camera-based sensor. Approaches 2 and 4 are advantageous in situations where it is not desirable to require a known entity to make the calculations.

It is to be further understood that in making geometrical calculations it may be advantageous to convert geolocations from WGS84 datum/ellipsoid locations to the Earth-centered, Earth-fixed (ECEF) Cartesian Coordinate System for decreased error margin. Thus, latitude, longitude, and altitude may be represented in terms of x, y, and z.

Figure 3:
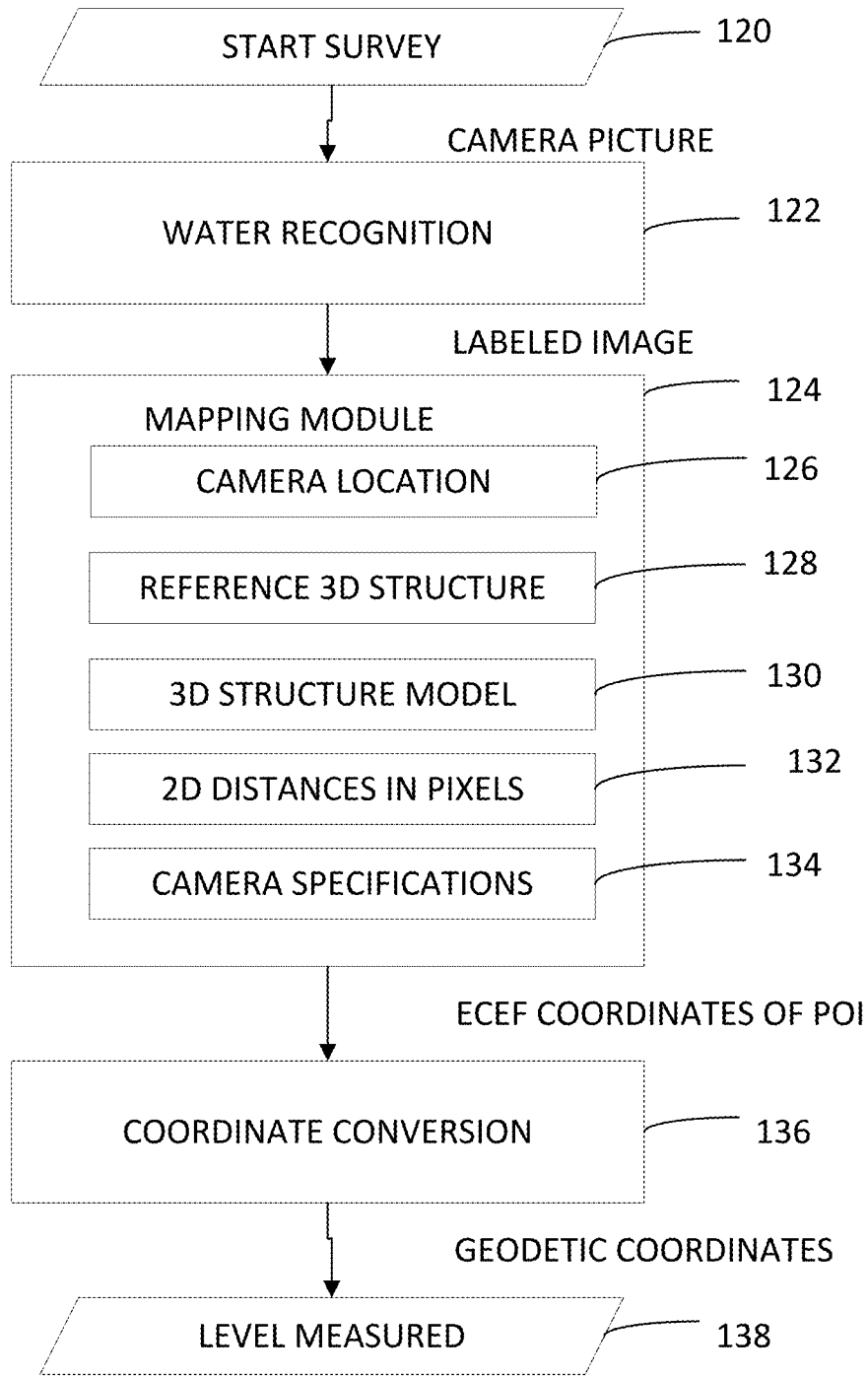
FIG. 3 illustrates one example of a process which may be used in continuous monitoring.

FIG. 3 illustrates one example of a process which may be used in continuous monitoring. In step 120 a survey is started. A camera picture, photo, or image is obtained as a part of the survey and in step 122 water is recognized within the picture. Any number of different processes or procedures may be used in order to recognize water in the picture. This may include any number of image processing algorithms or machine learning algorithms including algorithms for image segmentation, object or pattern recognition, and other types of algorithms as may be appropriate in a particular application or environment. After the water recognition step 122 an image may be provided which is labeled and which may then be provided to a mapping module 124.

The mapping module may use data from surveys including camera location 126, a reference 3D structure 128, a 3D structure model 130, 2D distances measured in pixels 132 (or otherwise), and camera specifications 134. The result of the mapping module 124 is the position of the point of intersection. It is contemplated that this position may be in ECEF coordinates. Thus, in step 136 these coordinates may be converted to geodetic coordinates. Then in step 138 the level is determined with the resulting altitude being the water level.

Figure 4:
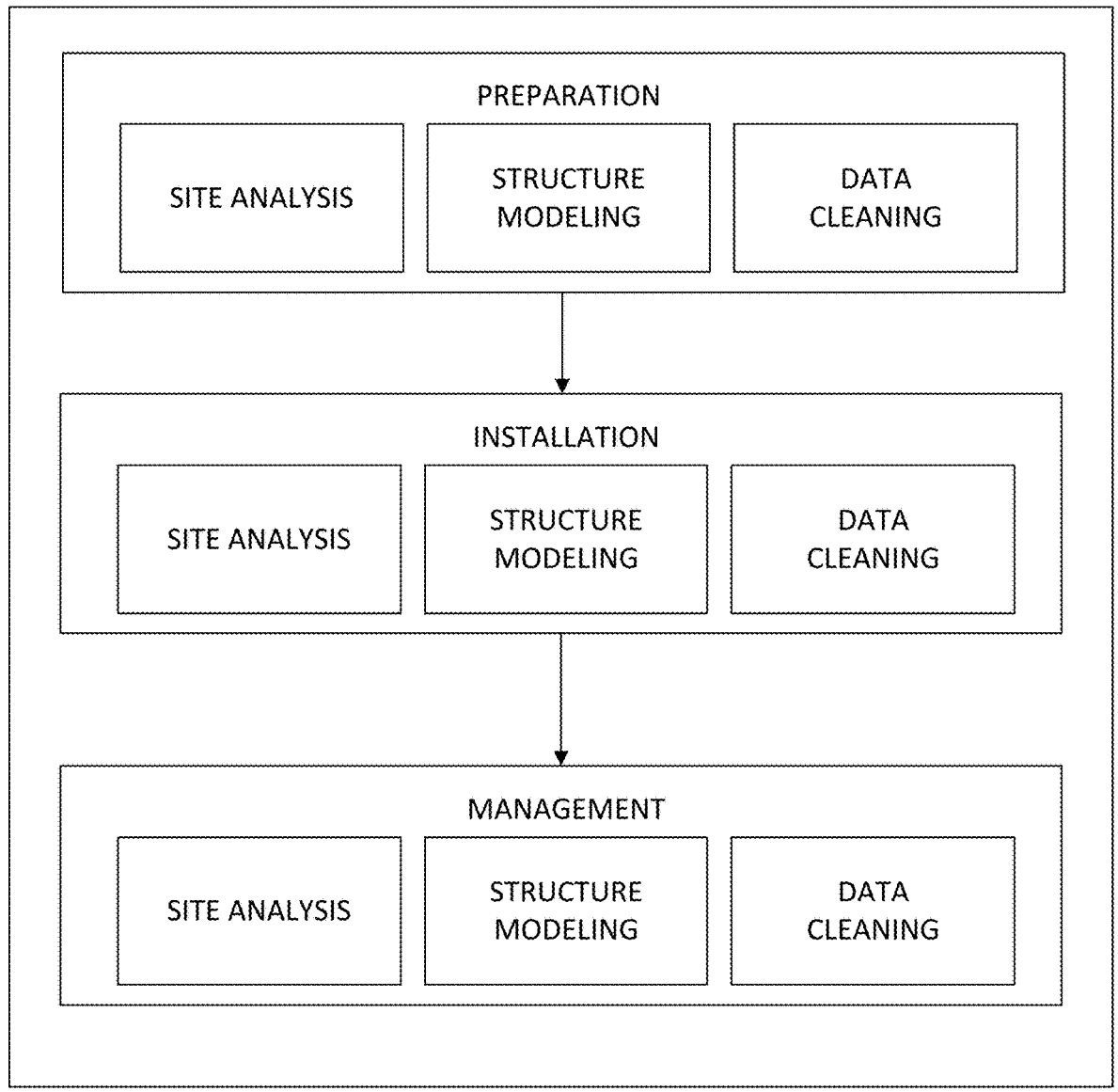
FIG. 4 illustrates one example of a process for sensor deployment.

FIG. 4 illustrates one example of a process for sensor deployment. Where sensors are to be deployed at a site, various steps may be performed for sensor deployment. This may include preparation of the site such as through performing a site analysis, performing structure modeling, and performing any desired data cleaning. Real-world 3D structures can be defined in various ways. This may include extracting points on Google Earth or other geographical information systems, obtaining manual measurements such as using laser sensors, utilizing high-resolution DEM data, retrieving structure plans from local agencies or elsewhere. After preparation, the sensors may be installed at a site. This may involve precisely positioning the sensors, automatically initializing the sensors, and performing manual calibration as needed to provide desired accuracy. Once installed, the sensors may be managed in various ways such as by making setting adjustments as needed, handling any errors, and performing data transfers as needed.

Figure 5:
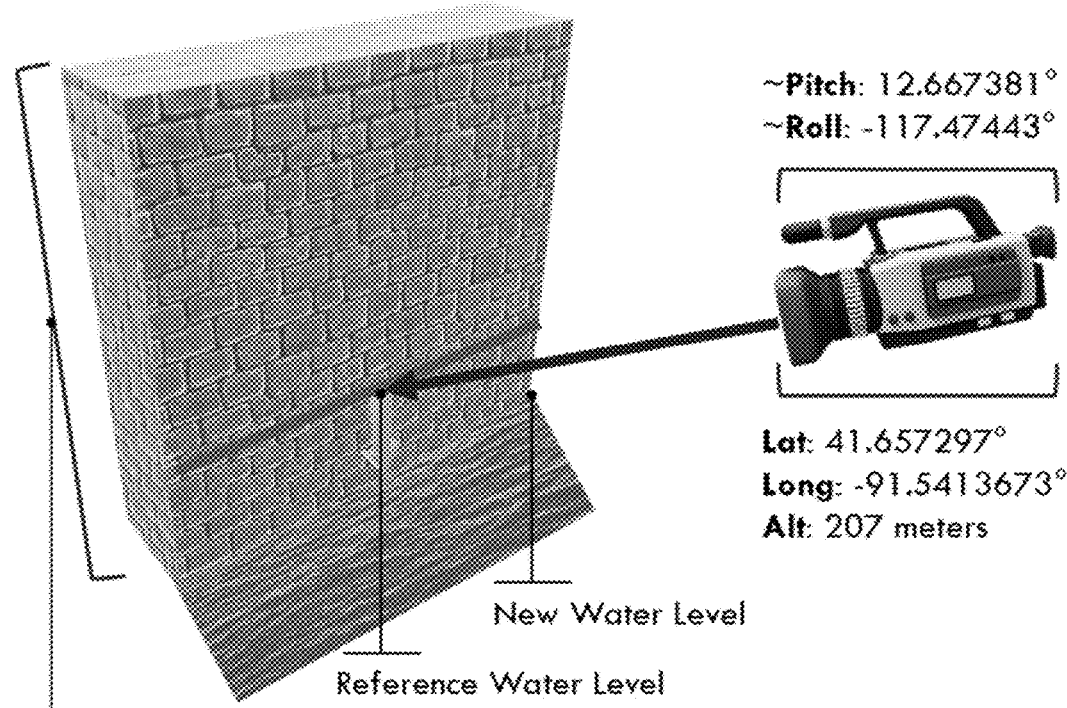
FIG. 5 illustrates results of a simulation for measuring water level.

FIG. 5 illustrates results of a simulation for measuring water level. As shown in FIG. 5, a pitch and roll of the camera is measured using an IMU associated with the camera. In addition, a position of the camera is determined shown here as a latitude, a longitude, and an altitude. In the example shown here, a known structure is shown. The known structure may be defined as a 3D plane using three points, each of the points has a latitude, longitude, and altitude. The water level intersects the known structure at a point. Determination of the point of intersection results in determination of an altitude level for this point. A reference water level or altitude may be used in order to provide a basis for comparison or relative characterization of the new water level. As shown in FIG. 5, results of this methodology provided a measured level of 188.7218055 meters which compares favorably with a true level of 189 meters.

Figure 6:
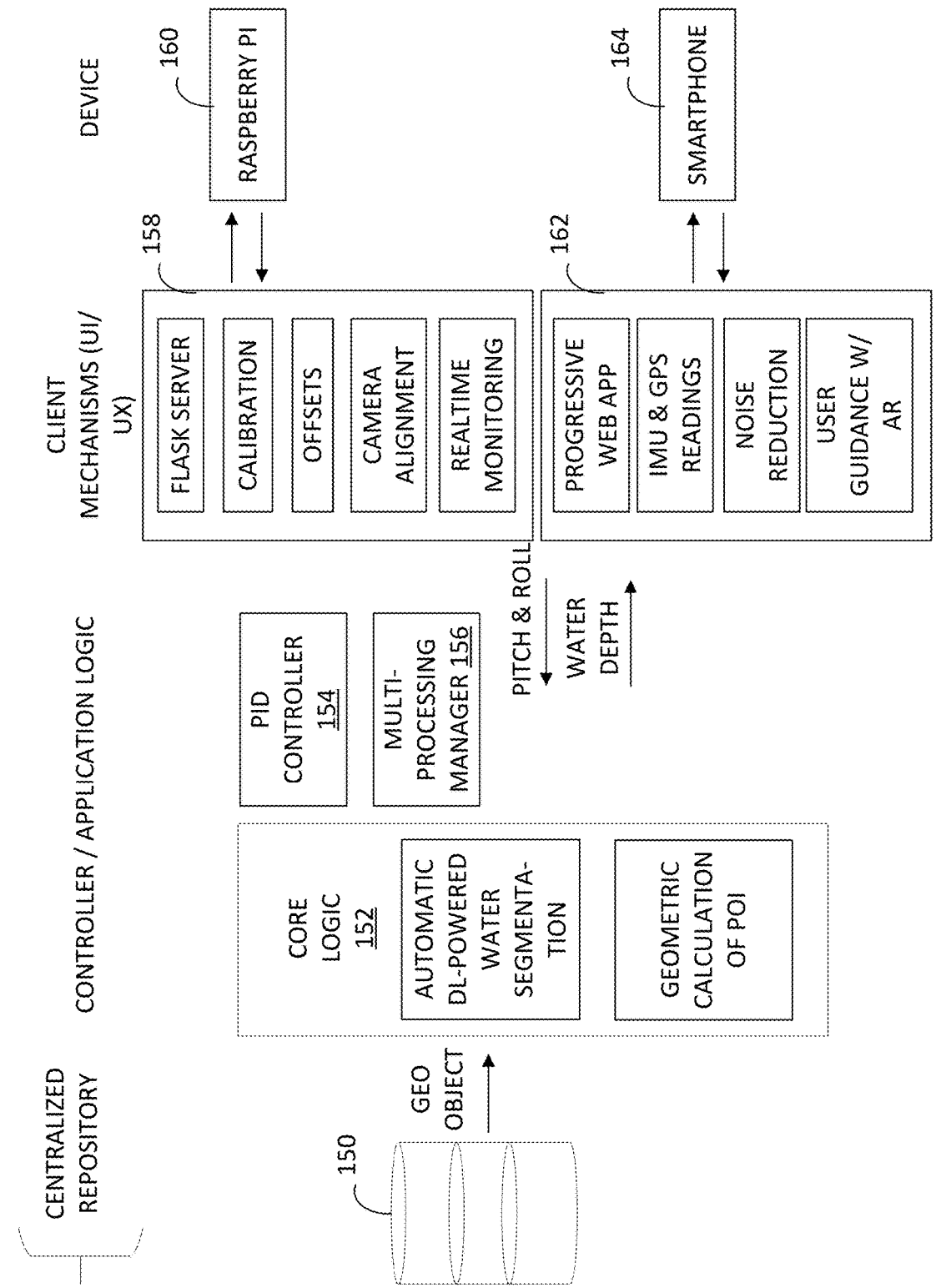
FIG. 6 illustrates one example of an architecture of systems which may be implemented using either a mobile application executing instructions from a non-transitory machine readable medium or a special purpose control system such as may be made specifically for measurement purposes.

FIG. 6 illustrates one example of an architecture of systems which may be implemented using either a mobile application executing instructions from a non-transitory machine readable medium or a special purpose control system such as may be made specifically for measurement purposes.

A central repository 150 is shown which may be used to store information use as known structure locations and/or their geometries. Information regarding a geo-object may be used by core logic 152. The core logic 152 may include logic to perform object segmentation including segmentation of water (or other resource). This segmentation may be performed using deep learning (DL) algorithms or other types of processes or algorithms as may be appropriate for different implementations or environments. The core logic 152 also provides for geometric calculation of the point of intersection such as may be provided using one or more of the geometric methods described herein. It is to be understood that a single mobile application or a single device may provide for applying one or more of the geometric methods described. Thus, for example, different methods may be applied based on the availability of inputs. For example, when structure information is available one type of geometric method may be performed. When structure information is not available then another type of geometric may be performed. When the implementation is performed using special purpose system a PID controller 154 may be included such as may be used to control servos associated with the system. Thus, one or more cameras of the system may be re-positioned. Control of the camera may be performed in various ways. For example, image-based (2D) control may be used with the logic configured to minimize error between the location of observed features and a desired location. In operation, water segmentation information previously determined provides an outline if a perimeter of the water body. The PID controller 154 may provide for aiming one or more cameras up and down. In addition, the PID controller 154 may be used to move left or right if water cannot be found in the centerline of the image. The PID controller 154 may provide to the servos a point location to aim at. This point is selected as the point on the perimeter that is (1) closest to image center and (2) does not have another perimeter point down in its orthographic projection (e.g. upper side of the perimeter).

Similarly, a multi-processing manager 156 may be included where concurrent operations need to be managed such as recognition, calculation, manual input, camera movement. The controller or application logic may receive information such as pitch and roll from the client mechanisms and then provide height or depth information such as water depth when the system is being used to measure water level. The client mechanisms for the control system 158 may include a flask server which is accessible from the local network. It may provide the user interface for monitoring and controlling the device. Various functionality may include monitoring the camera, aligning the camera (such as by setting orientation by moving the camera up and down or left and right), setting orientation offsets (such as for pitch and roll), and setting sensor geolocation (e.g. latitude, longitude, and altitude). Of course, any number of other types of servers may be used as may be appropriate for different types of computing platforms. The client mechanisms may further provide for calibration, offsets, camera alignment, and real-time monitoring. As previously described, one type of controller may use a Raspberry Pi 160, although any number of other single board computers, or other platforms may be used. When implemented for a mobile device, the client mechanisms 162 may include a progressive web app, IMU and GPS readings, noise reduction, and user guidance with augmented reality. Such a web app allows users to perform measurements with their smart phone or other mobile devices including devices running the iOS or Android platforms. The web app may access mobile features such as GPS, sensors, and camera without requiring native development. Measurement can be performed using a photo that aims to the water intersection. Thus, as previously explained, the system may be implemented using a smart phone 164. It is also to be understood that a network for monitoring a resource such as a stream or river may use a combination of specific purpose devices as well as smart phones executing mobile applications to determine levels at different locations in order to provide data for any number of different types of analysis including predictive analysis regarding flooding.

Figure 7:
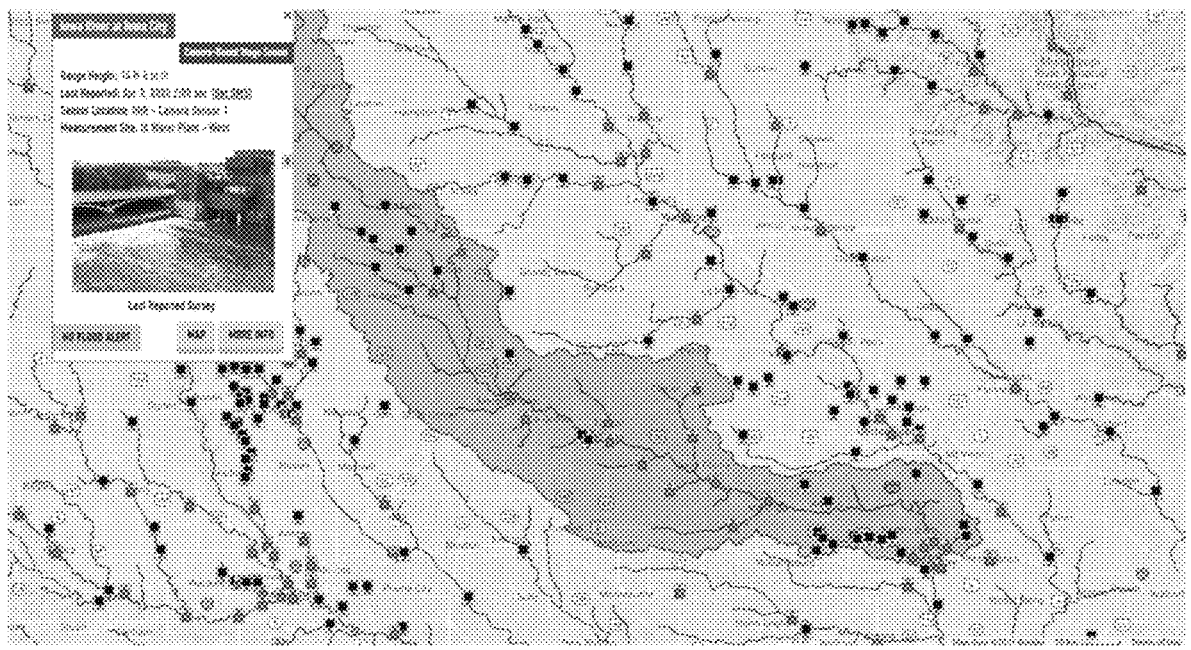
FIG. 7 illustrates an example of a web-based system which may be used to display water levels.

FIG. 7 illustrates an example of a web-based system which may be used to display water levels and/or calculate water levels based on results of surveys. It is to be understood that such a system may be constructed in any number of different ways as may be appropriate for a particular application or environment. It is to be further understood, that data collected and shown on such a system may include both data collected with special purpose monitoring devices and data collected with mobile devices. It is to be further understood that the data collected and shown on such a system may include water levels determined using alternative geometric methods.

The various methodologies described herein may be deployed into any number of different types of electronic devices including smartphones and embedded systems. The various methodologies may be used to measure the real-world elevation of any accumulating resource in a container with a visually distinguishable intersecting object. Examples include water where the intersecting object may be land, a building, another type of structure or a bridge. In another example the resource may be oil and the intersecting object may be oil storage tanks. Of course, it is contemplated that any number of other resources may be used with any number of other intersecting objects. In one embodiment, cost-effect water elevation measurement sensors may be built using an embedded system (e.g. Raspberry Pi, Arduino).

In addition to determining liquid level, it should be appreciated that the presence of the camera may be used for other purposes such as recognizing objects (e.g. debris, tree, human, boat) on the water surface using artificial intelligence, pattern recognition, machine learning, deep learning, or other algorithms.

The invention is not to be limited to the particular embodiments described herein. In particular, the invention contemplates numerous variations in the manner in which an elevation is computed, the devices or systems used in computing the elevation, the type of accumulating liquid being measured, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

Although throughout the description various examples given, water is often used as the accumulating resource. However, it is to be understood that any number of different types of other resources may be used. For example, other types of liquids may be used such as oil. In other applications, the accumulating resource may be snow. In still other applications, the accumulating resource may be sand or dust. In still other applications, the accumulating resource may be grain such as corn or soybeans. It is to be further understood that the elevation of the accumulating resource may be combined with other data to provide additional information to characterize the accumulating resource. In addition, any number of different types of actions may be taken based on the data or the characterization of the data. This may include generating an alert (such as a flooding alert) or performing other action.

REFERENCES

The following references regardless of whether cited above are hereby incorporated by reference in their entireties.

Android Developers, 2018. Location strategies [online]. Available from: http://developer.android.com/guide/topics/location/strategies [Accessed 17 Oct. 2018].

Apple Developer Documentation, 2021. Understanding Reference Frames and Device Attitude [online]. Available from: https://developer.apple.com/documentation/coremotion/getting_processed_device-motion_data/understanding_reference_frames_and_device_attitude [Accessed 30 Mar. 2021].

Bishop, G. and Welch, G., 2001. An introduction to the Kalman filter. Proc of SIGGRAPH, Course, 8 (27599-3175), 59.

Bonney, R., et al., 2009. Citizen science: a developing tool for expanding science knowledge and scientific literacy. BioScience, 59 (11), 977-984. doi:10.1525/bio.2009.59.11.9

Buchanan, T. J. and Somers, W. P., 1996. Discharge measurements at gaging stations [Online]. Reston, VA: U.S. Geological Survey Techniques of Water-Resources Investigations, ch. A8. Available from: http://pubs.usgs.gov/twri/twri3a8/

Chandler, J. H., et al., 2008. Measuring a dynamic and flooding river surface by close range digital photogrammetry. Beijing, China: International Society for Photogrammetry and Remote Sensing.

Demir, I., et al., 2009. Information systems and social legitimacy scientific visualization of water quality. In: Systems, man and cybernetics, 2009. SMC 2009. International conference on IEEE. San Antonio, TX: IEEE, 1067-1072.

Demir, I., et al., 2015. Data-enabled field experiment planning, management, and research using cyberinfrastructure. Journal of Hydrometeorology, 16 (3), 1155-1170. doi:10.1175/JHM-D-14-0163.1

Demir, I., et al., 2018. FLOODSS: Iowa flood information system as a generalized flood cyberinfrastructure. International Journal of River Basin Management, 16(3), 393-400. doi:10.1080/15715124.2017.1411927

Demir, I. and Beck, M. B., 2009. GWIS: A prototype information system for Georgia watersheds. In: Georgia water resources conference: regional water management opportunities. Athens, GA: UGA.

Demir, I. and Krajewski, W., 2013. Towards an integrated flood information system: centralized data access, analysis, and visualization. Environmental Modeling and Software, 50, 77-84. doi:10.1016/j.envsoft.2013.08.009

The European Global Navigation Satellite Systems Agency, 2018. FCC approves use of galileo in the U.S. Press Release [Online]. Available from: https://www.gsa.europa.eu/newsroom/news/fcc-approves-use-galileo-us Euston, M., et al., 2008. Complementary filter for attitude estimation of a fixed-wing UAV. In: Proceedings of the IEEE/RSJ International Conference on Intelligent Robots and Systems (IROS), 22-26 Sep. 2008 Nice, France.

Gleason, C. J., et al., 2015. Semi-automated effective width extraction from time-lapse RGB imagery of a remote, braided Greenlandic river. Hydrology and Earth System Sciences, 19 (6), 2963. doi:10.5194/hess-19-2963-2015

Horwitz, J., 2018. FCC lets U.S. phones access EU satellites for 3-foot location accuracy. Venture Beat [Online]. Available from: https://venturebeat.com/2018/11/16/fcc-lets-u-s-phones-access-eu-satellites-for-3-foot-location-accuracy/

Kim, J., Han, Y., and Hahn, H., 2011. Embedded implementation of image-based water-level measurement system. IET Computer Vision, 5 (2), 125-133. doi:10.1049/iet-cvi.2009.0144

Krajewski, W. F., et al., 2017. Real-time flood forecasting and information system for the state of Iowa. Bulletin of the American Meteorological Society, 98 (3), 539-554. doi:10.1175/BAMS-D-15-00243.1

Kruger, A., et al., 2016. Bridge-mounted river stage sensors (BMRSS).

IEEE Access, 4, 8948-8966. doi:10.1109/ACCESS.2016.2631172

Leduc, P., Ashmore, P., and Sjogren, D., 2018. Stage and water width measurement of a mountain stream using a simple time-lapse camera. Hydrology and Earth System Sciences, 22 (1), 1-11. doi:10.5194/hess-22-1-2018

Lin, F., et al., 2013. Applications of image recognition for real-time water level and surface velocity. In: 2013 IEEE international symposium on multimedia (ISM). Anaheim, Calif.: IEEE, 259-262.

Lowry, C. S. and Fienen, M. N., 2013. CrowdHydrology: crowdsourcing hydrologic data and engaging citizen scientists. GroundWater, 51 (1), 151-156. doi:10.1111/gwat.2013.51.issue-1

Madgwick, S., 2010. An efficient orientation filter for inertial and inertial/magnetic sensor arrays. Report X-io and University of Bristol (UK), 25, 113-118.

Mahony, S., Hamel, T., and Pflimlin, J.-M., 2008. Nonlinear complementary filters on the special orthogonal group. IEEE Transactions on Automatic Control, 53, 1203-1218. doi:10.1109/TAC.2008.923738

Mason, D.C., Bates, P. D., and Dall'Amico, J. T., 2009. Calibration of uncertain flood inundation models using remotely sensed water levels. Journal of Hydrology, 368 (1-4), 224-236. doi:10.1016/j.jhydrol.2009.02.034

Momeni-K, M., et al., 2012. Height estimation from a single camera view. VISAPP, 1, 358-364.

Mordvintsev, A. and Abid, K., 2013. Depth map from stereo images [online]. Available from: https://opencv-python-tutroals.readthedocs.io/en/latest/py_tutorials/py_calib3d/py_depthmap/py_depthmap. html [Accessed 17 Oct. 2018].

Mourcou, Q., et al., 2015. Performance evaluation of smartphone inertial sensors measurement for range of motion. Sensors, 15 (9), 23168-23187. doi:10.3390/s150923168

Mrovlje, J. and Vrancic, D., 2008. Distance measuring based on stereoscopic pictures. In: 9th international PhD workshop on systems and control: young generation viewpoint. Izola, Slovenia, Vol. 6.

National Research Council, 2007. Improving disaster management: the role of IT in mitigation, preparedness, response, and recovery. Washington, D.C.: The National Academies Press. doi:10.17226/11824

Sermet, Y. and Demir, I., 2018. An intelligent system on knowledge generation and communication about flooding. Environmental Modelling & Software, 108, 51-60. doi:10.1016/j.envsoft.2018.06.003

Sermet, Y., Demir, I. and Muste, M., 2020. A serious gaming framework for decision support on hydrological hazards. *Science of The Total Environment*, 728, p. 138895.

Sit, M. A. and Demir, I., 2019. Decentralized flood forecasting using deep neural networks. Arxiv Preprint, 50, 77-84. doi:10.1016/j.envsoft.2013.08.009

Tauro, F., et al., 2018. Measurements and observations in the XXI century (MOXXI): innovation and multi-disciplinarity to sense the hydrological cycle. Hydrological Sciences Journal, 63 (2), 169-196. doi:10.1080/02626667.2017.1420191 van Diggelen, F. and Enge, P., 2015. The World's first GPS MOOC and worldwide laboratory using smartphones. In: Proceedings of the 28th international technical meeting of the satellite division of the institute of navigation (ION GNSS+2015). Tampa, Florida, 361-369.

Young, D. S., Hart, J. K., and Martinez, K., 2015. Image analysis techniques to estimate river discharge using time-lapse cameras in remote locations. Computers & Geosciences, 76, 1-10. doi:10.1016/j.cageo.2014.11.008

Zhao, C., Sun, Q., Zhang, C., Tang, Y. and Qian, F., 2020. Monocular depth estimation based on deep learning: An overview. *Science China Technological Sciences*, pp. 1-16.

What is claimed is:

1. A method for measuring elevation of an accumulating resource with a visually distinguishable intersecting object, the method comprising:
    providing an electronic device comprising a camera and at least one position sensor;
    performing at least one survey by obtaining sensor readings from the at least one position sensor while the camera is aimed at an intersection between the accumulating resource and the visually distinguishable intersecting object;
    determining a geolocation and a pitch angle of the camera using the sensor readings;
    determining a roll of the camera using the sensor readings;
    computing by a processor of the electronic device the elevation of the accumulating resource using the geolocation, the pitch angle of the camera, and the roll of the camera by
        obtaining a 3D earth surface model for an area including the intersection,
        constructing a directional vector from the geolocation of the camera to the intersection using the geolocation, pitch angle, and roll of the camera, and
        determining the elevation of the accumulating resource at the intersection using the directional vector and the 3D earth surface model.

2. The method of claim 1 wherein the accumulating resource is water within a river.

3. The method of claim 1 wherein the electronic device is a mobile phone.

4. The method of claim 1 wherein the at least one position sensor comprises a geolocation receiver and an inertial sensor.

5. The method of claim 1 wherein the electronic device further comprises a LIDAR sensor.

6. A method for measuring elevation of an accumulating resource with a visually distinguishable intersecting object, the method comprising:
    providing an electronic device comprising a camera and at least one position sensor;
    performing at least one survey by obtaining sensor readings from the at least one position sensor while the camera is aimed at an intersection between the accumulating resource and the visually distinguishable intersecting object;
    determining a geolocation, a pitch angle of the camera, and a roll of the camera using the sensor readings;
    receiving at a processor of the electronic device a 3D earth surface model for an area including the intersection;
    constructing using the processor of the electronic device a directional vector from the geolocation of the camera to the intersection using the geolocation, pitch angle, and roll of the camera;

computing by the processor of the electronic device the elevation of the accumulating resource at the intersection using the directional vector and the 3D earth surface model.

7. The method of claim 6 wherein the accumulating resource is water within a river.

8. The method of claim 6 wherein the electronic device is a mobile phone.

9. The method of claim 6 wherein the at least one position sensor comprises a geolocation receiver and an inertial sensor.

10. The method of claim 6 wherein the electronic device further comprises a LIDAR sensor.

* * * * *